July 4, 1944. N. E. GUNDERSON 2,352,832
METHOD FOR PREVENTING DEPOSITS WITHIN WATER
FORMATIONS AND ON WELL SCREENS
Filed Oct. 15, 1941
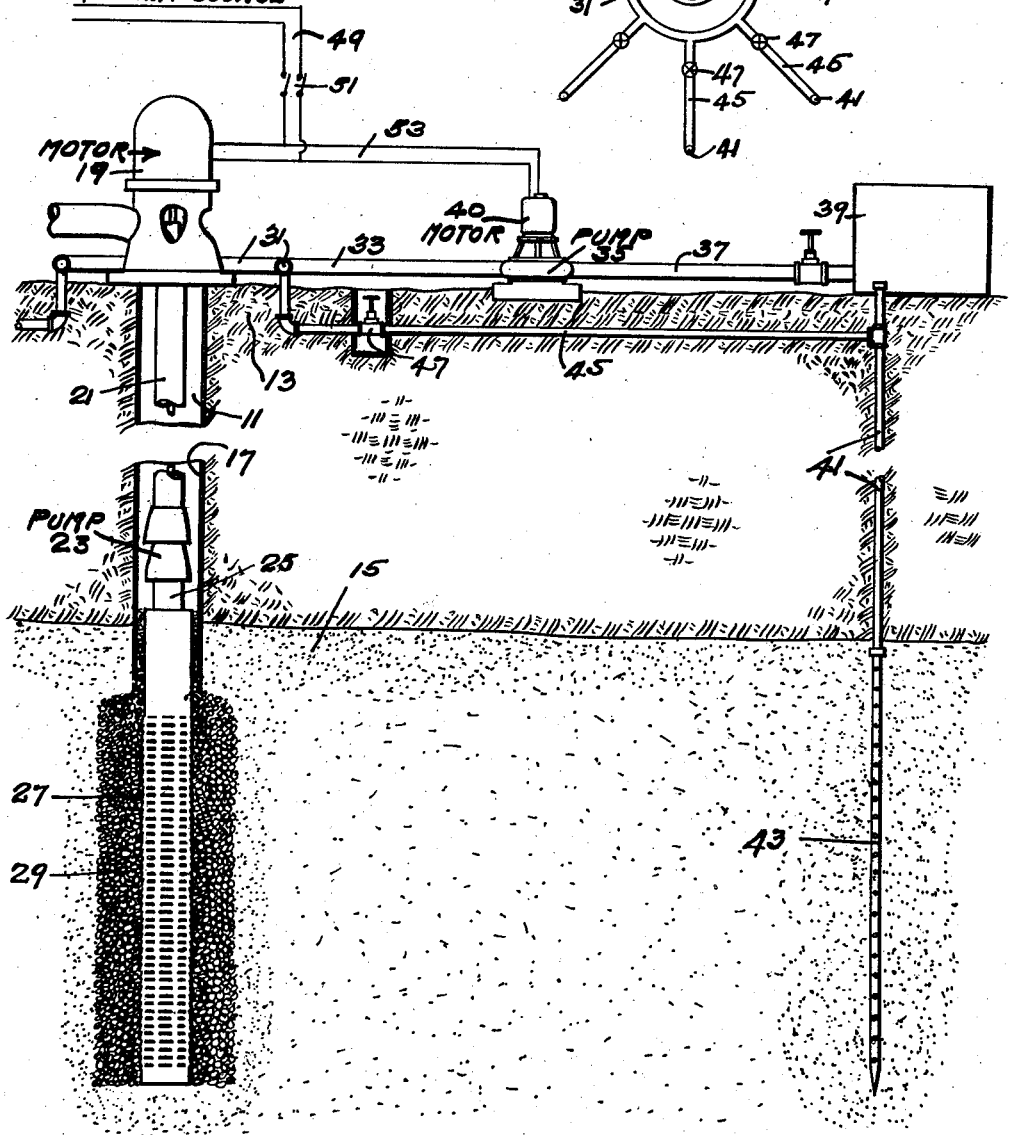
INVENTOR.
NORRIS E. GUNDERSON
BY J. H. Weatherford Patented July 4, 1944

2,352,832

UNITED STATES PATENT OFFICE 2,352,832

METHOD FOR PREVENTING DEPOSITS WITHIN WATER FORMATIONS AND ON WELL SCREENS

Norris E. Gunderson, Mishawaka, Ind., assignor to Layne-Northern Company, Incorporated, Mishawaka, Ind., a corporation of Indiana Application October 15, 1941, Serial No. 414,996

4 Claims. (Cl. 166—21)

This invention relates to means for treating in situ, water bearing strata, ordinarily sand, to neutralize or otherwise change the nature of chemicals carried by the waters therein, primarily in order that deposition of oxide or other scale on the well screen during pumping from such sands may be minimized if not entirely eliminated.

Many sources of water have an excessive iron content which is disagreeable and which forms iron oxide deposits on the screen or when brought to the surface has to be removed by treatment. Other water sources have a calcium carbonate content which on agitation and relief of pressures forms a deposit on the well screen and cause serious trouble, and still others have other chemical contents which give trouble or otherwise are objectionable.

It is known that certain chemical solutions will prevent the deposition of dissolved iron compounds at increased values of pH. Also certain proprietary chemicals will prevent the deposition of iron and carbonate compounds, but heretofore it has not been known how to make use of, and secure the benefits of, such treatments in water wells.

The particular chemical used, however, forms no part of the present invention and must be selected after the nature of the water to be treated has been examined and the particular correction need determined. Depending on the nature of the water, dilute hydrochloric acid, carbonated water, liquid chlorine, lime water, or such proprietary chemical, for example as is disclosed in Reissue Patent 20,754 may be used.

Hydrochloric acid: It is well known in the art of chemistry and well treatment that dilute hydrochloric acid solutions will dissolve calcium carbonate and such iron compounds as iron oxide, some forms of iron hydroxide, some iron sulphides, Crenothrix bacteria, etc., and the actions and reactions are discussed at length in the patent to Bowman, 1,809,546. Such deposits are formed in the well pump, well screen, and surrounding sand and gravel causing a reduction in the capacity of the well. Hydrochloric acid may also obviously be used to reduce the caustic alkalinity of the well water and prevent the deposition of carbonates in the well structure and surrounding sand and gravel.

Carbonated water: It is well known in the art of chemistry and water treatment that the addition of carbon dioxide to water will furnish carbonated water in liquid form which may be used to convert caustic alkalinity and calcium carbonate into the soluble bicarbonate. Carbonated water; that is, water saturated with carbon dioxide, will reduce the pH value of the well water and prevent the precipitation of carbonates and certain iron compounds in the well screen and surrounding sand and gravel.

Liquid chlorine: It is well known in the art of chemistry and water treatment that liquid chlorine is particularly effective where slime-forming bacteria or iron bacteria, such as the Crenothrix, are especially active, and extensive use of such chemical is made in the sterilization of water. Incrustations from these micro-organisms occur in the well pump, the well screen, the well casing, in contact with the water, and the surrounding sand and gravel. The slimes or organic deposits accumulate adjacent to the steel and corrosion is accelerated. The growth and excretions of these bacteria produce gelatinuous deposits which have great plugging power and so may greatly reduce the capacity of the well. The application of liquid chlorine to the water in the formation will prevent the growth of said bacteria and also will remove any that may be in existence prior to the treatment.

Lime water: It is well known in the art of chemistry and water treatment that lime added to water will reduce the acidity and corrosivity of the water, and increase its pH value. In waters which are under-saturated with calcium carbonate, corrosion of the well structure will result, whereas, super-saturation will build up an excessive scale. In either event, the capacity of the well is reduced because of the damage to the openings in the well screen. In undersaturated waters the addition of lime will reduce the acidity and build up a thin protective film on the steel structure as a protection against corrosion. The lime, being only slightly soluble in water, forms a suspension known as milk of lime. In general this suspended portion of the lime is filtered out and only that portion freely and fully soluble is used, although if it is not in such excess as to have plugging powers in the well formation, the milk of lime may satisfactorily be used.

Metaphosphates: It is well known in the art of chemistry and water treatment that sodium hexametophopshate and other related metaphosphates, as disclosed in Reissue Patent No. 20,754, are soluble in water and will prevent the deposition of carbonates and iron compounds from waters. By applying the metaphosphates in the formation, proper mixing occurs and deposits on the well structure and in the surrounding sand and gravel are substantially prevented.

The objects of the present invention are:

To provide means and methods for making use of the known properties of these chemicals to secure the desired results in a practical and efficient way.

I accomplish the objects of the invention by introducing the treating chemical into the water bearing sands entirely exterior to the strainer and screening medium therearound and spaced outward and away from such medium to allow the thorough mingling of the chemical with the waters to be treated and its distribution and action prior to the time that it reaches such screening medium.

The means by which this and other objects are accomplished will readily be understood from the following specification upon reference to the accompanying drawing, in which:

Fig. 1 is a diagrammatic sectional elevation showing a well with pumping and screening mechanism therein and means for introducing chemicals into a sand formation, the drawing including one only of the introducing pipes.

Fig. 2 is a diagrammatic plan view showing the manner of spacing the chemical injection tubes relatively to the well.

In the drawing it is intended to indicate both the well pumping mechanism and chemical distributing mechanisms as typical respectively of means for withdrawing water from the well and of means for introducing and distributing the chemical, it being understood not only that the motor and pumps in both cases are typical only, but that any known type of pumping means, such for instance as the well known air lift, may be used, and that the term "pump" as herein used is inclusive of all such types.

Referring now to the drawing in which the various parts are indicated by numerals:

11 is a well bore extending through overlying strata 13 into a water bearing formation 15 and here shown as protected to such formation by a casing 17.

19 is a motor, from which a pump column 21 depends, the column carrying a pump 23 with suction pipe 25 depending into a screen 27, the latter being shown disposed in a sand formation 15 and surrounded by an additional screening medium of gravel aggregate 29.

Disposed about the base of the motor 19 is a distributor ring or header 31, which is fed through a pipe 33 by a pump 35 which draws its supply through a pipe 37 from a tank or other source 39 and is driven by a motor 40.

Disposed around and spaced outwardly from the well and the header 31 are a plurality of injection tubes 41 which preferably are about equally spaced from the well and at uniform distances apart. Ordinarily these tubes may be some ten feet away from the well and preferably a somewhat less distance apart, the distance outward being greater in free flowing formations than in denser areas. Each of these tubes extends downward into the formation 15, and in such formation has a perforated section 43 from which treatment solution may escape, the perforated section preferably extending at least to the level of the bottom of the well. These injection tubes are each individually connected by pipes 45 to the header 31, each pipe 45 preferably having a valve 47 through which flow may be regulated or entirely cut off.

In Fig. 1 of the drawing the header 31 and pipes 33 and 37 are shown above ground, and the pipes 45 below ground, but it will be understood that all the pipes may be buried or all be above ground as may suit the individual conditions. Preferably the motors 19 and 40 are electric motors powered from a suitable electric source through a power line 49, a switch 51 and wiring 53 jointly controlled by the switch 51 so that both motors start at the same time and the cut-off of the pumping motor 19 effects the cut-off of the chemical distributing pump 35.

Obviously in many cases the pump 35 may be dispensed with and treatment liquid fed from a supply source by gravity flow, the pipes 33 and 37 being directly connected without the interposed pump 35, or as shown, a by-pass pipe 34 may connect these pipes around the pump, this pipe being provided with a cut-off valve 36 so that pumping or gravity may be used at option.

The injection tubes 41 preferably extend above the surface and may be capped, or otherwise closed. If desired, treatment may be effected by removing these caps and feeding the treating solution directly into the tubes, or water-soluble treatment chemical in solid form, but preferably in a pulverized state, may be fed into them, the water in the formation dissolving the chemicals so fed in and distributing them for use.

Where treatment chemical is introduced in liquid or solid form directly into the injection tubes it is obvious that the pump 33, header 31, and the connecting pipes may be dispensed with.

In carrying out the method the treatment chemical, in liquid or solid form, as the case may be, and in either case miscible with water, is introduced into the injection tubes 41 from which it escapes, or is dissolved and distributed into the water bearing formation surrounding these tubes, and is carried by the water drawn past these tubes by the well pump 23. During the flow of this water to the well the chemical is thoroughly mixed and incorporated therewith and distributed therethrough by the sand or other formation constituent through which it must pass to reach the well. Reaching the well any inert deposit which may have accomplished travel through the formation, is filtered out by the surrounding aggregate 29, the water is drawn in through the screen 27, substantially without deposit thereon, and delivered from the well by the pump 23 in the usual manner.

If the complete apparatus shown is utilized, the chemical solution is stored in the tank 39 from which it is withdrawn by the pump 35 and delivered through the header 31 and the radial pipes 45 to the injection tubes 41 and from these through the perforated portions 43 of such tubes. Flow to the individual injection tubes may be regulated by the valves 47, any one or more of which may be entirely closed if desired. Obviously if gravity pressure be found sufficient the liquid may be fed by gravity from the tank through the header and distributed in like manner.

The flow of chemical is relatively minor as compared to well discharge flow and is regulated to prevent over treatment and waste, as by throttling liquid flow or feeding measured quantities of solid chemical.

It will be understood that the chemical used must be not only soluble in the water, but must also be adapted to accomplish the desired reaction, and must be introduced in such quantity, relatively minor, as related to the water flow, that it will effect the desired result and that the spacing of the introduction tubes away from the well must be determined with reference to the denseness of the formation and freedom of flow through the formation, such denseness being readily determinable during drilling of the well, and freedom of flow by well discharge. Obviously the chemical to be used is determined after examination of the water itself shows need of treatment, the nature of the treatment needed, and which of the numerous chemicals available will most effectually accomplish the desired reaction.

I claim:

1. The method of substantially preventing deposits on well screens, which are located in water bearing sand formations in which said water carries ingredients tending to form deposits on said screens during pumping; which method includes selecting a reagent freely and fully soluble in water and adapted to react on said ingredients to prevent such deposit; and feeding extremely minor total quantities of said reagent relatively to said pumping flow into said formation at a plurality of introduction centers spaced at substantially uniform intervals, annularly around and away from said screen in the line of water flow to said well, and at a distance therefrom to establish complete mingling of said reagent with said water and its action on said ingredients prior to reaching said screen.

2. The method of substantially preventing deposits on well screens, which are located in water bearing sand formations in which said water carries ingredients tending to form deposits on said screens during pumping; which method includes selecting a liquid reagent freely miscible in water and adapted to react on said ingredients to prevent such deposit; and feeding extremely minor total quantities of said reagent relatively to said pumping flow, into said formation at a plurality of introduction centers spaced at substantially uniform intervals, annularly around and away from said screen in the line of water flow to said well, and at a distance therefrom to establish complete mingling of said reagent with said water and its action on said ingredients prior to reaching said screen.

3. The method of substantially preventing deposits on well screens, which are located in water bearing sand formations in which said water carries ingredients tending to form deposits on said screens during pumping; which method includes selecting a solid reagent freely soluble in water and adapted to react on said ingredients to prevent such deposit; and feeding extremely minor total quantities of said reagent relatively to said pumping flow, into said formation at a plurality of introduction centers spaced at substantially uniform intervals, annularly around and away from said screen in the line of water flow to said well, and at a distance therefrom to establish complete mingling of said reagent with said water and its action on said ingredients prior to reaching said screen.

4. The method of minimizing deposits on well screens, which are located in water bearing sand formations and in which said water carries ingredients tending to form deposits on said screens during pumping, which method includes selecting a liquid reagent freely and fully soluble in water and adapted to inhibit deposit of said ingredients, and establishing and controlling flow of said reagent into said formation at a plurality of introduction centers spaced at substantially uniform intervals, annularly around and away from said screen in the line of water flow to said well, and at a distance therefrom to establish complete mingling of said reagent with said water and its action on said ingredients prior to reaching said screen.

NORRIS E. GUNDERSON.